United States Patent Office 3,242,099
Patented Mar. 22, 1966

3,242,099
OLEFIN POLYMERIZATION CATALYSTS
Robert M. Manyik, St. Albans, Wellington E. Walker and Thomas P. Wilson, Charleston, and George F. Hurley, St. Albans, W. Va., assignors to Union Carbide Corporation, a corporation of New York
No Drawing. Filed Mar. 27, 1964, Ser. No. 355,448
16 Claims. (Cl. 252—429)

This application is a continuation-in-part of an application entitled "Olefin Polymerization," Serial No. 72,584, filed on November 30, 1960, now abandoned.

This invention relates to the polymerization of mono-unsaturated alpha-olefins. More particularly, it is concerned with a new catalytic process for the polymerization of said olefins and with the catalyst complexes per se.

It is well known that mono-unsaturated alpha-olefins can be polymerized with a catalyst composition consisting of a mixture of two components. In these known catalyst compositions the two components are a compound of a transition metal of Groups IVA, VA, and VIA, and a compound of a metal of Groups IA, IIA, and IIIB of the Periodic Chart of the Atoms. The compounds of the metals of Groups IA, IIA, and IIIB can be the organo metallic compounds, the organo metallic halide compounds, the organo metallic hydrides, or the metal hydrides. The Periodic Chart referred to is the 1956 Edition published by W. M. Welch Manufacturing Company, Chicago, Illinois.

It has now been found that mono-unsaturated alpha-olefins can be polymerized to produce solid high molecular weight polymers by contacting them with a catalyst complex as hereinafter set forth. The catalyst complexes of this invention can comprise the complex obtained from two components or the complex obtained from three components.

In the embodiment wherein two components are present, the two components used to produce the catalyst complex are (1) the poly(hydrocarbylaluminum oxides) and (2) the transition metal compounds of the metals of Groups IVA, VA, and VIA. In that embodiment wherein three components are present, the three components making up the catalyst complex of this invention are (1) the poly(hydrocarbylaluminum oxides), (2) the transition metal compounds of the metals of Groups IVA, VA, and VIA, and (3) a compound of the metals of Groups IA, IIA, and IIIB of the Periodic Chart of the Atoms.

The poly(hydrocarbylaluminum oxide) used as a component for the catalyst complex in this invention consists essentially of units which can be represented by the general formula:

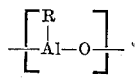

wherein R represents an alkyl radical containing from 1 to about 12 carbon atoms, or an aryl radical, for example, phenyl, phenethyl, methoxyphenyl, benzyl, tolyl, xylyl, naphthyl, naphthal, methylnaphthyl, and the like. Among the alkyl radicals which R can represent one can mention methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, and the like.

Illustrative of the suitable poly(hydrocarbylaluminum oxides) are poly(methylaluminum oxide), poly(ethylaluminum oxide), poly(isopropylaluminum oxide), poly(n-butylaluminum oxide), poly(isobutylaluminum oxide), poly(decylaluminum oxide), poly(dodecylaluminum oxide), poly(benzylaluminum oxide), poly(phenylaluminum oxide), poly(tolylaluminum oxide), poly(naphthylaluminum oxide), poly(ethylnaphthylaluminum oxide), and the like.

The poly(hydrocarbylaluminum oxides) are produced by the reaction of water with an organo hydrocarbylaluminum compound which contains at least one hydrocarbyl radical attached to the aluminum atom. The term "hydrocarbyl" as used in this application represents a saturated alkyl group or an aryl radical, as defined above. The reaction of water with the organo hydrocarbylaluminum compound is preferably carried out by adding the water to a solution of the organo hydrocarbylaluminum compound in an anhydrous, inert, organic solvent. The concentration of the organo hydrocarbylaluminum compound in the solvent can vary from about 5 percent by weight or less to as high as about 75 percent by weight or more. Suitable organic solvents are, among others, the saturated aliphatic compounds, for example, hexane, heptane, pentane, isooctane, purified kerosene, et cetera; the cycloaliphatics such as cyclopentane, cyclohexane, methylcyclopentane, dimethylcyclopentane, et cetera; the aromatic solvents such as benzene, toluene, xylene, et cetera, and the like. The only requirement in the selection of the inert organic solvent is that it be liquid at the reaction temperature and that it does not react with the water or the organo hydrocarbylaluminum compound charged, or interfere with the reaction in any way whatsoever.

The organo hydrocarbylaluminum compounds suitable for use as starting materials in the preparation of the poly(hydrocarbylaluminum oxides) are represented by the general formula:

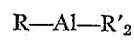

wherein R has the same meanings as previously defined and R' represents an alkyl radical containing from 1 to about 12 carbon atoms, an aryl radical, or a hydrogen atom.

The hydrocarbylaluminum compounds which can be used in the reaction with water to produce the poly(hydrocarbylaluminum oxide) are those having a carbon to aluminum bond. Among the hydrocarbylaluminum compounds that can be used as starting materials one can mention the trialkylaluminum compounds, the triarylaluminum compounds, the dialkylaluminum hydrides, the diarylaluminum hydrides, the alkylarylaluminum hydrides, the monoalkylaluminum dihydrides, the monoarylaluminum dihydrides, and the like. Illustrative thereof one can mention trimethylaluminum, triethylaluminum, tripropylaluminum, triisopropylaluminum, tri-n-butylaluminum, triisobutylaluminum, trihexylaluminum, trioctylaluminum, tridecylaluminum, tridodecylaluminum, tribenzylaluminum, triphenylaluminum, trinaphthylaluminum, tritolylaluminum, dimethylaluminum hydride, diisobutylaluminum hydride, dihexylaluminum hydride, didecylaluminum hydride, diphenylaluminum hydride, dixylylaluminum hydride, dinaphthylaluminum hydride, methylphenylaluminum monohydride, ethylnaphthylaluminum monohydride, methylaluminum dihydride, ethylaluminum dihydride, butylaluminum dihydride, isobutylaluminum dihydride, octylaluminum dihydride, dodecylaluminum dihydride, phenylaluminum dihydride, tolylaluminum dihydride, naphthylaluminum dihydride, and the like.

The poly(hydrocarbylaluminum oxides) can be prepared by slowly adding the necessary amount of water to the hydrocarbylaluminum compound. This addition of water is carried out at a temperature of from about 0° C. to about 100° C.; preferably at a temperature of from about 10° C. to about 65° C.

The amount of water added to the hydrocarbylaluminum compound to produce the poly(hydrocarbylaluminum oxides) can be varied from about 0.25 mole to about 1.5 moles of water per mole of hydrocarbylaluminum compound with the range of from about 0.5 to about 1.25 more desirable. The preferred range, however, is from about 0.85 mole to about 1.05 moles of water per mole of hydrocarbylaluminum compound. While this range is preferred, the broader range can be employed, but it has been found that when the amount of water employed is outside of the preferred range, the poly(hydrocarbylaluminum oxide) produced is not as satisfactory a product for use as a catalyst component. It has also been found that when an amount of water in excess of 1 mole is employed, some alumina is formed which either precipitates out of solution or forms a gel. It has further been found that the most preferred range is from about 0.95 mole to about 1.05 moles of water per mole of hydrocarbylaluminum compound.

Among the transition metal compounds of the metals of Groups IVA, VA, and VIA which can be used as the second component of the catalyst compositions useful in this invention are the compounds of the metals titanium, zirconium, hafnium, cerium, vanadium, niobium, tantalum, chromium, molybdenum, tungsten thorium and uranium. The suitable compounds can be represented by the formula $MX_n$ in which M represents the transition metal atom X represents a halogen atom or an organic group, such as an alkoxy or ester radical, and $n$ is the valence state of the transition metal. Illustrative of some of the transition metal compounds which can be used one can mention, for example, vanadium dichloride, vanadium trichloride, vanadium tetrachloride, vanadium trifluoride, vanadium tetrafluoride, vanadium pentafluoride, vanadium triiodide, vanadyl chloride, titanium dibromide, titanium tribromide, titanium tetrabromide, titanium dichloride, titanium trichloride, titanium tetrachloride, titanium trifluoride, titanium tetrafluoride, titanium diiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, and the like. Among the organic compounds of the transition metals one can mention chromium actate, chromium(III) oxy-2-ethylhexanoate, chromium(III) 2-ethylhexanoate, chromium(III) dichloroethylhexanoate, chromium(II) 2-ethylhexanoate, titanium(IV) 2-ethylhexanoate, zirconyl tetrabutoxide, chromium(III) isobutoxide, titanium tetraethoxide, dicyclopentadienyltitanium dichloride, dicyclopentadienyltitanium difluoride, dicyclopentadienylvanadium dichloride, zirconyl acetate, uranyl butyrate, vanadyl acetylacetonate, chromium acetylacetonate, zirconyl acetylacetonate, and the like.

The third component of the catalyst complex when it is present is a compound represented by the formula:

$$MeR'_x$$

wherein R' has the same meanings as defined above, Me is a metal from the Groups IA, IIA, or IIIB, and $x$ is an integer corresponding to the valence of said metal. These compounds are well known to those skilled in the art.

The polymerization catalyst complex can be prepared by procedures known to the art by adding the catalyst components to the inert, organic polymerization solvent. In the preferred manner the catalyst mixture is prepared by first producing the poly(hydrocarbylaluminum oxide) in the form of a concentrated solution, taking a portion of this reaction mixture and further diluting it with diluent, adding the transition metal compound to this diluted mixture, and then adding this mixture to a solution of the third component the organo metallic compound of the metals of Groups IA, IIA, and IIIB if the third component is to be used.

The inert organic diluents useful for the polymerization reaction are the same diluents employed in producing the poly(hydrocarbylaluminum oxides). The polymerization of the mono-unsaturated alpha-olefins is carried out by contacting the alpha-olefin with the mixture of the catalyst complex in the inert diluent.

The composition of the catalyst complex is such that it contains from about 0.001 to about 0.05 millimole of the transition metal compound $MX_n$; from about 0.2 to about 20 millimoles of the poly(hydrocarbylaluminum oxide); and, when present, from about 0.1 to about 2 millimoles of the compound of the metals of Groups IA, IIA, and IIIB, per liter of inert diluent. Preferably when it is present the concentration of the compound of the metals of Groups IA, IIA, and IIIB is kept as low as possible; and is dependent to some degree on the purity of the solvent, with purer solvents requiring smaller amounts. However, when a solvent is not employed or the solvent is free of trace impurities which will destroy the effectiveness of the catalyst complex, this third component can and is preferably omitted. The mole ratio of the transition metal in the transition metal compound to the aluminum in the poly(hydrocarbylaluminum oxide) can be varied from 1:30 to about 1:800 but is preferably from about 1:40 to 1:200.

By varying the ratios of the components used to produce the catalyst complex and the components employed and by varying the temperature, pressure, and time of reaction, one can vary the properties of the polyolefin produced.

The polymerization can be carried out at temperatures of from about $-10°$ C. or lower up to about $100°$ C., preferably at a temperature of from about $40°$ C. to about $80°$ C. The pressure can be varied from subatmospheric pressure, using an inert gas as diluent, to superatmospheric pressures up to about 100 atmospheres. Preferably, however, the reaction is carried out at a pressure of about 5 to 30 atmospheres.

It has been found that a small amount of hydrogen present during the polymerization has an effect upon the average molecular weight of the polymer produced. In particular, the presence of hydrogen during the polymerization serves to lower the average molecular weight of the polymer formed.

Among the mono-unsaturated alpha-olefins which can be polymerized by this invention are the mono-unsaturated aliphatic alpha-olefins containing from 2 to about 10 carbon atoms. Illustrative of the alpha-olefins which can be polymerized one can mention ethylene, propylene, butene-1, pentene-1, 3-methylbutene-1, hexene-1, 4-methylpentene-1, 3-ethylbutene-1, heptene-1, octene-1, decene-1, 4,4-dimethyl-1-pentene, 4-4,-diethyl-1-hexene, 3,4-dimethyl-1-hexene, and the like, and including within the definition the bicycloheptenes such as bicyclohept-[2.2.1]-ene and the hydrocarbyl derivatives thereof. The purity of the alpha-olefin feed may vary from about 94 percent to about 100 percent; the only requirement is that the alpha-olefin be free of impurities which would inactivate the catalyst. It is preferred, however, to use monomers of high purity in order to achieve greater utilization of the catalyst.

The density of the polyolefins was determined according to the procedure described by E. Hunter and W. G. Oaks, Trans. Faraday Society, 41, 49; the melt index was determined according to the procedure described in ASTM D-1238-52T; and the flow rate was determined by the same procedure used to determine the melt index but employing a weight which was either 4.7 times as great or 10 times as great as that specified in the ASTM procedure. The following examples further illustrate the process of this invention but are not to be construed as being limitative thereof.

Example 1

A clean, dry reaction flask was flushed with dry, oxygen-free nitrogen and fitted with a serum cap. Ninety milliliters of dry, oxygen-free heptane, which had been passed through a dry silica gel column and purged with dry, oxygen-free nitrogen, was injected into the reaction flask with a hypodermic syringe. An 8-gram portion of triisobutylaluminum (40 millimoles) was similarly added. A hypodermic needle attached to a nitrogen line feed with a mineral oil bubbler was inserted into the serum cap to relieve pressure due to the isobutane evolved during the reaction. While continually agitating, 0.71 milliliter of water (about 40 millimoles) was slowly added from a hypodermic syringe at a temperature of about 45° C. and over a period of about 25 minutes. The reaction product produced was poly(isobutylaluminum oxide).

In the same manner as described above, a series of reactions was carried out to produce additional samples of the poly(hydrocarbylaluminum oxide) compounds. For convenience, these runs are tabulated below, including the run outlined above.

Example 3

Ethylene was polymerized in a manner similar to that described in Example 2. The catalyst composition consisted of 0.24 gram of triisobutylaluminum, a portion containing 12 millimoles of poly(isobutylaluminum oxide) from Run G of Example 1, and 0.006 gram of chromium (III) 2-ethylhexanoate. The catalyst mixture was allowed to age in the reaction flask for one hour at 60° C. under a dry nitrogen atmosphere before the addition of the ethylene monomer. Ethylene was bubbled through the catalyst for a total period of about 76 minutes. The dried polyethylene weighed 21.6 grams and it had a melt index of 0.69 dgm./minute, and a flow rate of 56 from a 4.7 times determination.

Example 4

Ethylene was polymerized in a manner similar to that described in Example 2, except that the heptane solution was heated to 40° C. after the triisobutylaluminum had been added to it, and the temperature was raised to 60° C. after the other catalyst components had been added. The catalyst composition consisted of 0.08 gram of triisobutylaluminum, a portion containing 12 millimoles of poly(isobutylaluminum oxide) from Run G of Example 1

| Run | Alkyl | Volume, Milliliters | Weight, grams | Millimoles | Solvent Volume, Milliliters | Water Added, Millimoles | Maximum Temperature [1] |
|---|---|---|---|---|---|---|---|
| A | Triisobutylaluminum | 10 | 8 | 40 | 90 | 40 | |
| B | ----do---- | 10 | 8 | 40 | 90 | 40 | |
| C | ----do---- | 5 | 4 | 20 | 15 | 17 | |
| D | ----do---- | 10 | 8 | 40 | 10 | 34 | |
| E | ----do---- | 50 | 40 | 200 | 150 | 170 | 80 |
| F | Triethylaluminum | 10 | | 75 | 65 | 75 | 65 |
| G | Triisobutylaluminum | 50 | 40 | 200 | 150 | 170 | [2] 75–78 |
| H | ----do---- | 27.5 | 22 | 110 | 75 | 93 | 75 |
| I | ----do---- | 25 | 20 | 100 | 75 | 85 | [2] 75–80 |
| J | ----do---- | 25 | 20 | 100 | 75 | 100 | 65 |

[1] Started at room temperature and temperature allowed to rise with heat of reaction.
[2] Started at 75°, actual temperature range.

Example 2

A 1-liter polymerization flask was equipped with a high speed stirrer, a gas inlet tube, a gas exit tube, a thermocouple well, an opening fitted with a serum cap, a liquid inlet tube, and a liquid exit tube extending to the bottom of the flask. The equipment was scrupulously cleaned and dried, and finally flushed with dry, oxygen-free nitrogen. A 500-milliliter portion of pure, dry n-heptane, which had been passed through a silica gel column and stored over sodium after bubbling enough nitrogen through it to sweep out any entrained oxygen, was added to the polymerization flask. The heptane was heated to 60° C. and 0.35 gram of isobutylaluminum dichloride was injected by means of a hypodermic syringe through the serum cap. Then 4 millimoles of poly(isobutylaluminum oxide) obtained from Run 1C above, and 0.47 gram of titanium tetrachloride were injected through the serum cap. Stirring was stopped and the system was purged with about 0.2 cubic foot of pure ethylene. Stirring was resumed and ethylene was bubbled through the reaction mixture for about 86 minutes. At the end of this time about 50 milliliters of isopropanol was added and the polymer suspension was filtered. The filter cake was washed once with isopropanol and dried. Yield was 17.7 grams of polyethylene having a melt index of 0.93 dgm. per minute, and a flow rate of 12.2 from a 4.7 times determination.

High molecular weight, solid polyethylene is produced under similar polymerization conditions using a catalyst complex consisting of two components only, poly(isobutylaluminum oxide) and titanium trichloride.

above, and 0.006 gram of chromium (III) 2-ethylhexanoate. Ethylene was bubbled through for 60 minutes. The dried polyethylene had a melt index of 0.61 dgm./minute, and a flow rate of 48 from a 4.7 times determination.

Example 5

Ethylene was polymerized in a manner similar to that described in Example 4. The catalyst composition consisted of 0.24 gram of triisobutylaluminum, a portion containing 12 millimoles of poly(isobutylaluminum oxide) from Run G of Example 1, and 0.006 gram of chromium (III) 2-ethylhexanoate. The dried polyethylene had a melt index of 12.2 dgm./minute, a flow rate of 229 from a 4.7 times determination, and a density of 0.9617 gram/cc.

Example 6

Ethylene was polymerized in a manner similar to that described in Example 4 except that toluene was used as a solvent in this example. The catalyst composition consisted of 0.24 grams of triisobutylaluminum, a portion containing 12 millimoles of poly(isobutylaluminum oxide) from Run I of Example 1, and 0.006 gram of chromium(III) 2-ethylhexanoate. Ethylene was fed into the reaction mixture for a period of about 48 minutes. The polyethylene produced was a stringy solid of high molecular weight.

Example 7

Ethylene was polymerized in a manner similar to that described in Example 4. The catalyst composition consisted of 0.4 gram of triisobutylaluminum, a portion containing 12 millimoles of poly(isobutylaluminum oxide)

from Run G of Example 1, and 0.006 gram of chromium(III) 2-ethylhexanoate. Ethylene was bubbled through the catalyst mixture for about 117 minutes. The solid polyethylene weighed 31.3 grams after drying.

For convenience, all of the experiments are tabulated below:

| Run | Triisobutyl-aluminum, grams | Poly(isobutyl-aluminum oxide), millimoles | Chromium Compound, grams | Temp-ature, °C. | Time, minutes | Yield, grams | Melt Index, dgm./min. | Flow* Rate |
|---|---|---|---|---|---|---|---|---|
| A | 0.56 | a 3.2 | 0.25 | 82-103 | 5 | 39.8 | | |
| B | 0.4 | a 1.6 | 0.05 | 65-101 | 7.5 | 36.5 | 2.35 | 56.0 |
| C | 0.32 | b 0.8 | 0.03 | 62-70 | 12.5 | 13.5 | 0.054 | 1.08 |
| D | 0.24 | b 0.6 | 0.02 | 80-87 | 20 | 20.0 | 0.23 | 4.8 |
| E | 0.2 | b 1.0 | 0.011 | 71 | 20 | 21.5 | 0.037 | 0.90 |
| F | 0.56 | a 1.6 | d 0.03 | 64-97 | 10 | 31.5 | 1.44 | 34.0 |
| G | 0.28 | c 1 | 0.016 | 66-103 | 4 | 34.6 | | | a From Run A of Example 1.
b From Run B of Example 1.
c From Run C of Example 1.
d Chromium(III) acetate was used in this experiment.
* 4.7 times determination.

Example 8

Ethylene was polymerized in a manner similar to that described in Example 4. The catalyst composition consisted of 0.5 gram of tridodecylaluminum, a portion containing 12 millimoles of poly(isobutylaluminum oxide) from Run G of Example 1, and 0.006 gram of chromium(III) 2-ethylhexanoate. The dried polyethylene weighed 14.7 grams, and it had a melt index of 0.37 dgm./minute, and a flow rate of 30 from a 4.7 times determination.

Example 9

Ethylene was polymerized in a manner similar to that described in Example 4. The catalyst composition consisted of 0.24 gram of triisobutylaluminum, a portion containing 12 millimoles of poly(isobutylaluminum oxide) from Run G of Example 1, and 0.006 gram of chromium(II) 2-ethylhexanoate. The dried polyethylene weighed 30.7 grams, and it had a melt index of 2.37 dgm./minute, and a flow rate of 105 from a 4.7 times determination.

Example 10

A stainless steel autoclave, equipped with a gas tube fitted with a serum cap, was flushed with dry nitrogen and 250 milliliters of dry n-heptane was added. A 0.56 gram portion of triisobutylaluminum was added through the serum cap using a hypodermic syringe. The triisobutylaluminum was washed down with a small portion of dry heptane. A portion containing 3.2 millimoles of poly(isobutylaluminum oxide) from Run A of Example 1 was added and washed into the autoclave in a similar manner. The contents of the autoclave were then agitated for about one minute and then a mixture of 0.25 gram of chromium(III) oxy-2-ethylhexanoate in n-heptane was added and washed into the autoclave with sufficient n-heptane to give a total volume of 500 milliliters of n-heptane. The mixture was stirred and heated to 60° C. to 70° C. The pressure was released, and the system was then pressurized to 400 p.s.i.g. ethylene pressure. Ethylene was bubbled through the catalyst composition suspended in the solvent at a temperature of from 82° C. to 103° C. for a period of about 5 minutes. The contents were then cooled to room temperature and isopropanol was added to quench the catalyst complex. The slurry was filtered and the polyethylene filter cake was washed once with isopropanol. The dried polyethylene weighed 39.8 grams.

A series of experiments was carried out in the same manner as described above but varying the composition of the catalyst complex, the temperature, and the time.

Example 11

Ethylene was polymerized in a manner similar to that described in Example 10, at a pressure of 100 p.s.i.g. The catalyst composition consisted of a 4 milliliter portion of the poly(isobutylaluminum oxide) reaction product from Run J of Example 1, and 3.6 mgm. of vanadium tetrachloride. After a 5 minute reaction period there was obtained 7.3 grams of polyethylene.

The substitution of chromium acetylacetonate for the vanadium tetrachloride, in equivalent amount, also produces a catalyst complex that polymerizes ethylene to high molecular weight solid polyethylene.

Example 12

Ethylene was polymerized in a manner similar to that described in Example 11. The catalyst composition consisted of 0.24 gram of triisobutylaluminum, 5 mgm. of titanium(IV) 2-ethylhexanoate, and a 4 milliliter portion of the poly(isobutylaluminum oxide) reaction product from Run J of Example 1. Solid polyethylene was recovered after a one half hour reaction period.

Example 13

Ethylene was polymerized in a manner similar to that described in Example 10, at a temperature of 73° C. to 80° C. and a pressure of 400 p.s.i.g. The catalyst composition consisted of 0.05 gram of zirconyl acetate, 0.4 gram of triisobutylaluminum, and a 5 milliliter portion of the poly(isobutylaluminum oxide) reaction product from Run B of Example 1. After a 25 minute reaction period, 5.7 grams of solid polyethylene was recovered.

Example 14

Ethylene was polymerized in a manner similar to that described in Example 10, at a temperature of 74° C. to 92° C. and a pressure of 400 p.s.i.g. The catalyst composition consisted of 0.8 gram of triisobutylaluminum, 0.05 gram of uranyl butyrate, and a 3 milliliter portion of the poly(isobutylaluminum oxide) reaction product from Run A of Example 1. At the end of a 20 minute reaction, there was obtained 11 grams of polyethylene.

Example 15

A 15 milliliter pressure bottle was cleaned, dried, flushed with nitrogen, and closed with a serum cap. The following ingredients were added in the order stated: a 2 milliliter portion of poly(isobutylaluminum oxide) from Run E of Example 1, 0.02 millimole of chromium(II) 2-ethylhexanoate in 1 milliliter of heptane, and 10 milliliters of 4-methyl-1-pentene. The additions were made by means of hypodermic syringes. The reaction was permitted to proceed at ambient temperature for 16 days. The contents were then poured into isopropanol, filtered, and dried. The dry poly(4-methyl-1-pentene) weighed 1.8 grams.

In a similar manner, butene-1 is polymerized to produce poly(butene-1).

the autoclave was maintained at 100 p.s.i.g. For convenience, the experiments are tabulated below:

| Run | Triisobutyl-aluminum, grams | Poly(isobutyl-aluminum oxide), millimoles | Chromium Compound, grams | Temperature, °C. | Time, minutes | Yield, grams | Melt Index, dgm./min. | Flow* Rate |
|---|---|---|---|---|---|---|---|---|
| A | 0.24 | b 4.0 | f 0.002 | 66–72 | 30 | 28.8 | 1.52 | 44 |
| B | 0.24 | c 4.0 | f 0.004 | 70–76 | 32 | 14.9 | | |
| C | a 0.12 | c 4.0 | f 0.002 | 66–68 | 18 | 1 | | |
| D | 0.24 | c 1.0 | f 0.002 | 68–72 | 35 | 11.5 | | |
| E | 0.24 | c 2.0 | f 0.002 | 74–76 | 31 | 18 | | |
| F | 0.24 | d 5.0 | f 0.002 | 64–76 | 48 | 27 | | |
| G | 0.24 | d 4.0 | f 0.002 | 68–86 | 30 | 41 | | |
| H | 0.2 | c 2.0 | g 0.002 | 68–83 | 20 | 34 | 1.88 | 40 |
| I | 0.08 | c 2.0 | g 0.002 | 70–92 | 16 | 25 | | |
| J | | c 2.0 | g 0.002 | 70–80 | 30 | 12.5 | 0.052 | 0.99 |
| K | 0.24 | b 3.0 | h 0.001 | 66–74 | 38 | 20.3 | | | a Triethylaluminum was used in this experiment.
b From Run E of Example 1.
c From Run G of Example 1.
d From Run H of Example 1.
e From Run C of Example 1.
f Chromium (III) oxy-2-ethylhexoate.
g Chromium (II) 2-ethylhexoate.
h Chromium (III) acetate.
*4.7 times determination.

Example 16

(I) A one liter stainless steel autoclave was flushed with nitrogen and charged with 500 milliliters of anhydrous heptane, 0.16 gram of triisobutylaluminum, 0.8 millimole of poly(isobutylaluminum oxide), and 500 milliliters of gaseous hydrogen. The autoclave was sealed, heated to 70° C., and pressurized to 100 p.s.i.g. with ethylene. A solution of 2 mgm. of chromium(III) 2-ethylhexanoate in 20 milliliters of heptane was added to start the reaction. After 29 minutes at 70° C. and 100 p.s.i.g. of ethylene, the autoclave was cooled and vented. The contents were filtered and the polyethylene was washed with isopropanol and dried. The polymer had a melt index of 6.5 dgm./minute, a flow rate of 500 from the 10 times determination, a stiffness of 153,000 p.s.i., a density of 0.9638 g./cc., and 15.8 percent wax.

(II) When the reaction was repeated in the absence of hydrogen, there was obtained 44 grams of polyethylene after 47 minutes. This polymer had a melt index of 1.2 dgm./minute, a flow rate of 153, a stiffness of 149,000 p.s.i., a density of 0.9614 g./cc., and 16.9 percent wax.

Example 17

In a manner similar to that described in Example 10, ethylene was polymerized at a temperature of 70° C. to 75° C. and a pressure of 100 p.s.i.g. The catalyst consisted of 0.064 gram of triisobutylaluminum, 0.2 millimole of poly(isobutylaluminum oxide) and 4 mgm. of chromium(III) 2-ethylhexanoate. Eight hundred milliliters of hydrogen gas was introduced before heating and before the addition of the chromium(III) 2-ethylhexanoate. After a 32 minute reaction there was obtained 26 grams of solid polyethylene having a melt index of 1.1 dgm. per minute, a flow rate of 67 from a 10 times determination, a stiffness of 132,000 p.s.i., a density of 0.9527 g./cc., and 2.3 percent wax.

Example 18

Ethylene was polymerized in a manner similar to that described above in Example 10 except that the pressure in

Example 19

A copolymer of ethylene/butene-1 was produced in a manner similar to that described in Example 16(I). The catalyst composition consisting of 0.08 gram of triisobutylaluminum, 0.4 millimole of poly(isobutylaluminum oxide), and 4 mgm. of chromium(III) 2-ethylhexanoate. The monomers mixture contained 3 mole percent butene-1. After reacting for 63 minutes at 70° C. to 74° C. and a pressure of 100 p.s.i.g., there was obtained 44 grams of the copolymer, having a melt index of 0.19 dgm. per minute, a flow rate of 37.1 from a 10 times determination, a density of 0.9497 g./cc., a stiffness of 110,000 p.s.i., and 27.1 percent wax. The wax, as in all instances, could be removed by solution in boiling cyclohexane.

Example 20

A one liter stainless steel autoclave was flushed with nitrogen and charged with 500 milliliters of anhydrous heptane and 0.08 gram of triisobutylaluminum. The autoclave was sealed, heated to 70° C. and pressurized to 100 p.s.i.g. with a mixture of ethylene containing 3 mole percent butene-1. Then a mixture of 4 mgm. of chromium-(III) 2-ethylhexanoate and 0.2 millimole of poly(isobutylaluminum oxide) which had been aged overnight was pressured into the autoclave. After 21 minutes at 70° C. to 74° C. and a pressure of 100 p.s.i.g., there was obtained 21 grams of a copolymer of ethylene/butene-1 having a melt index of 0.01 dgm./minute, a flow rate of 4.8 from a 10 times determination, a density of 0.9483 g./cc., a stiffness of 110,000 p.s.i., and 5 percent wax.

Example 21

Ethylene was polymerized in a manner similar to that described in Example 19 except that the catalyst composition was free of triisobutylaluminum and consisted of two components only, the poly(isobutylaluminum oxide) and the chromium(III) 2-ethylhexanoate. The experiments are tabulated below:

| Run | Poly(isobutyl-aluminum, oxide) millimoles | Chromium compound, micromoles | Pressure, p.s.i.g. | Temperature, °C. | Time, minutes | Yield, grams | Melt Index, dgm/min. | Density, g/cc. |
|---|---|---|---|---|---|---|---|---|
| A a | 3.2 | 76 | 400 | 65–97 | 12 | 34.5 | | |
| B | 3.2 | 76 | 375 | 66–84 | 15 | 16.0 | | |
| C | 0.6 | 5 | 100 | 70–78 | 70 | 56.3 | 0.03 | 0.9491 |
| D | 2 | 10 | 100 | 70 | 69 | 41.5 | 0.05 | 0.9459 |
| E b | 2 | 10 | 150 | 70–74 | 63 | 40.0 | 0.06 | 0.9475 |
| F c | 6 | 10 | 100 | 70 | 46 | 23.5 | 0.15 | 0.9536 |
| G d | 0.8 | 10 | 100 | 70 | 47 | 21.5 | 0.17 | 0.9620 | a Hydrogen present.
b Ethylene-butene feed.
c Ethylene-butene-hydrogen feed.
d Isobutylene present.

As is well known the melt index of the polymer is a measure of the molecular weight of the resin and is inversely proportional thereto. The melt indices of the polyolefins produced by the processes of this invention can vary over a wide range from as low as a value of 0 to as high as 1000 dgm./minute, or higher. The density of the polyolefins can be varied. Thus, for example, the density of polyethylene can vary from about 0.93 to about 0.975 gram/cc. Generally, however, the polyethylene polymers produced by the processes of this invention have a density range from about 0.94 to about 0.96 gram/cc.

The amount of polymeric material formed which is soluble in boiling cyclohexane is affected by the excess present of the compounds of the metals of Groups IA, IIA, or IIIB; the total concentration of the catalyst complex; the presence of small amounts of other olefinic compounds; and by the presence of other impurities in the starting materials. Thus, constant control of these factors is desirable to keep the formation of cyclohexane soluble materials at a minimum.

The melt index of the polyolefins produced with the catalyst compositions of this invention can be controlled by controlling the polymerization temperature, since it was found to be affected very readily by changes in temperature. Thus, for example, the melt index of polyethylene has been shown to increase from 0.2 dgm./minute to 2.0 dgm./minute as the polymerization temperature was increased from 67° C. to 74° C.

The polymerization rate has also been found to be affected by the mole ratio of water to organo hydrocarbylaluminum compound used in preparing the poly(hydrocarbylaluminum oxide) component of the catalyst composition. It was found that optimum polymerization rate is achieved when the mole ratio of water to organo hydrocarbylaluminum compound is at about 1:1. Polymerization rates as high as 90,000 grams of polyethylene per millimole of transition metal per hour have been observed.

As is obvious to the ordinary scientist skilled in the art the processes of this invention can be carried out in a continuous manner or in a batchwise manner.

What is claimed is:

1. A polymerization catalyst comprising the product formed by reacting poly(hydrocarbylaluminum oxide) and a transition metal compound selected from the group consisting of the compounds of the metals of Groups IVA, VA, and VIA of the formula $MX_n$ wherein M represents the transition metal atom, X is a member selected from the group consisting of a halogen atom and an organic group, and $n$ is the valence state of the transition metal, said poly(hydrocarbylaluminum oxide) being the product of the reaction of from 0.25 to 1.5 mole of water per mole of organo hydrocarbylaluminum compound wherein the hydrocarbyl moiety thereof is selected from the group consisting of an alkyl radical containing from 1 to about 12 carbon atoms and an aryl radical selected from the group consisting of phenyl and naphthyl radicals.

2. A polymerization catalyst comprising the product formed by reacting a poly(hydrocarbylaluminum oxide), a transition metal compound selected from the group consisting of the compounds of the metals of Groups IVA, VA, and VIA of the formula $MX_n$ wherein M represents the transition metal atom, X is a member selected from the group consisting of a halogen atom and an organic group, and $n$ is the valence state of the transition metal, and a compound selected from the group consisting of the compounds of the metals of Groups IA, IIA, and IIIB, represented by the formula $MeR'_x$, wherein R' represents a member selected from the group consisting of an alkyl radical having from 1 to about 12 carbon atoms, an aryl radical, and a hydrogen atom, Me represents said metal, and $x$ is an integer corresponding to the valence of said metal, said poly(hydrocarbylaluminum oxide) being the product of the reaction of from 0.5 to 1.25 mole of water per mole of organo hydrocarbylaluminum compound wherein the hydrocarbyl moiety thereof is selected from the group consisting of an alkyl radical containing from 1 to about 12 carbon atoms and an aryl radical selected from the group consisting of phenyl and naphthyl radicals.

3. A polymerization catalyst comprising the product formed by reacting poly(hydrocarbylaluminum oxide) and a transition metal compound selected from the group consisting of the compounds of the metals of Groups IVA, VA, and VIA of the formula $MX_n$ wherein M represents the transition metal atom, X is a member selected from the group consisting of a halogen atom and an organic group, and $n$ is the valence state of the transition metal, said poly(hydrocarbylaluminum oxide) being the product of the reaction of from 0.5 to 1.25 mole of water per mole of organo hydrocarbylaluminum compound wherein the hydrocarbyl moiety thereof is selected from the group consisting of an alkyl radical containing from 1 to about 12 carbon atoms and an aryl radical selected from the group consisting of phenyl and naphthyl radicals.

4. A polymerization catalyst comprising the product formed by reacting a poly(hydrocarbylaluminum oxide) containing units represented by the general formula:

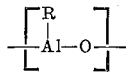

wherein R represents a member selected from the group consisting of an alkyl radical containing from 1 to about 12 carbon atoms and an aryl radical selected from the group consisting of phenyl and naphthyl nuclei, a transition metal compound selected from the group consisting of the compounds of the transition metals of Groups IVA, VA, and VIA of the formula $MX_n$ wherein M represents the transition metal atom, X is a member selected from the group consisting of a halogen atom and an organic group, and $n$ is the valence state of the transition metal, and a compound selected from the group consisting of the compounds represented by the formula:

$$MeR'_x$$

wherein R' represents a member selected from the group consisting of an alkyl radical containing from 1 to about 12 carbon atoms, an aryl radical, and a hydrogen atom, Me is a metal selected from the group consisting of the metals of Groups IA, IIA, and IIIB, and $x$ is an integer corresponding to the valence of said metal, said poly(hydrocarbylaluminum oxide) being the product of the reaction of the reaction of from 0.85 to 1.05 mole of water per mole of organo hydrocarbylaluminum compound.

5. A polymerization catalyst comprising the product formed by reacting a poly(hydrocarbylaluminum oxide) containing units represented by the general formula:

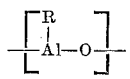

wherein R represents a member selected from the group consisting of an alkyl radical containing from 1 to about 12 carbon atoms and an aryl radical selected from the group consisting of phenyl and naphthyl nuclei, and a transition metal compound selected from the group consisting of the compounds of the transition metals of Groups IVA, VA, and VIA of the formula $MX_n$ wherein M represents the transition metal atom, X is a member selected from the group consisting of a halogen atom and an organic group, and $n$ is the valence state of the transition metal, said poly(hydrocarbylaluminum oxide) being the product of the reaction of from 0.85 to 1.05 mole of water per mole of organo hydrocarbylaluminum compound.

6. A polymerization catalyst comprising the product formed by reacting poly(isobutylaluminum oxide), triisobutylaluminum, and chromium(III) 2-ethylhexanoate, said poly(isobutylaluminum oxide) being the product of the reaction of from 0.85 to 1.05 mole of water per mole of isobutylaluminum.

7. A polymerization catalyst comprising the product formed by reacting poly(isobutyaluminum oxide), triisobutylaluminum, and chromium(II) 2-ethylhexanoate, said poly(isobutylaluminum oxide) being the product of the reaction of from 0.85 to 1.05 mole of water per mole of isobutylaluminum.

8. A polymerization catalyst comprising the product formed by reacting poly(isobutylaluminum oxide) triisobutylaluminum, and chromium III oxy-2-ethylhexanoate, said poly(isobutylaluminum oxide) being the product of the reaction of from 0.85 to 1.05 mole of water per mole of isobutylaluminum.

9. A polymerization catalyst comprising the product formed by reacting poly(isobutylaluminum oxide), triisobutylaluminum, and titanium IV 2-ethylhexanoate, said poly(isobutylaluminum oxide) being the product of the reaction of from 0.85 to 1.05 mole of water per mole of isobutylaluminum.

10. A polymerization catalyst comprising the product formed by reacting poly(isobutylaluminum oxide), triisobutylaluminum, and zirconium acetate, said poly(isobutylaluminum oxide) being the product of the reaction of from 0.85 to 1.05 mol of water per mole of isobutylaluminum.

11. A polymerization catalyst comprising the product formed by reacting poly(isobutylaluminum oxide), isobutylaluminum dichloride, and titanium tetrachloride, said poly(isobutylaluminum oxide) being the product of the reaction of from 0.85 to 1.05 mole of water per mole of isobutylaluminum.

12. A polymerization catalyst comprising the product formed by reacting poly(isobutylaluminum oxide), tridodecylaluminum, and chromium III 2-ethylhexanoate, said poly(isobutylaluminum oxide) being the product of the reaction of from 0.85 to 1.05 mole of water per mole of isobutylaluminum.

13. A polymerization catalyst comprising the product formed by reacting poly(isobutylaluminum oxide) and titanium trichloride, said poly(isobutylaluminum oxide) being the product of the reaction of from 0.85 to 1.05 mole of water per mole of isobutylaluminum.

14. A polymerization catalyst comprising the product formed by reacting poly(isobutylaluminum oxide) and vanadium tetrachloride, said poly(isobutylaluminum oxide) being the product of the reaction of from 0.85 to 1.05 mole of water per mole of isobutylaluminum.

15. A polymerization catalyst comprising the product formed by reacting poly(isobutylaluminum oxide) and chromium III 2-ethylhexanoate, said poly(isobutylaluminum oxide) being the product of the reaction of from 0.85 to 1.05 mole of water per mole of isobutylaluminum.

16. A polymerization catalyst comprising the product formed by reacting poly(isobutylaluminum oxide) and chromium acetylacetonate, said poly(isobutylaluminum oxide) being the product of the reaction of said 0.85 to 1.05 mole of water per mole of isobutylaluminum.

References Cited by the Examiner

UNITED STATES PATENTS

| | | | |
|---|---|---|---|
| 3,135,705 | 6/1964 | Vandenberg | 260—2 |
| 3,152,105 | 10/1964 | Long | 260—94.9 |

FOREIGN PATENTS

| | | |
|---|---|---|
| 2,984,658 | 5/1961 | Germany. |

TOBIAS E. LEVOW, *Primary Examiner.*